United States Patent
Chen et al.

(10) Patent No.: US 9,220,094 B2
(45) Date of Patent: *Dec. 22, 2015

(54) METHOD, ACCESS POINT AND TERMINAL FOR SELECTING CHANNEL IN WIRELESS LOCAL AREA NETWORKS

(71) Applicant: INTERNATIONAL BUSINESS MACHINES CORPORATION, Armonk, NY (US)

(72) Inventors: Lin Chen, Beijing (CN); He Yuan Huang, Beijing (CN); Qian Ma, Beijing (CN); Yin Ben Xia, Beijing (CN); Yan Feng Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/055,231

(22) Filed: Oct. 16, 2013

(65) Prior Publication Data

US 2014/0044077 A1 Feb. 13, 2014

Related U.S. Application Data

(63) Continuation of application No. 13/563,013, filed on Jul. 31, 2012, now Pat. No. 8,611,298, which is a continuation of application No. 12/607,688, filed on Oct. 28, 2009, now Pat. No. 8,265,027.

(30) Foreign Application Priority Data

Oct. 30, 2008 (CN) .......................... 2008 1 0170699

(51) Int. Cl.
*H04W 72/04* (2009.01)
*H04W 72/08* (2009.01)

(52) U.S. Cl.
CPC ........ *H04W 72/042* (2013.01); *H04W 72/0426* (2013.01); *H04W 72/0486* (2013.01); *H04W 72/08* (2013.01)

(58) Field of Classification Search
CPC .......... H04W 72/0426; H04W 72/042; H04W 72/0486; H04W 72/08
USPC ........... 370/328, 329–338; 455/41.2, 62, 450, 455/453
See application file for complete search history.

(56) References Cited

U.S. PATENT DOCUMENTS 7,020,439 B2 * 3/2006 Sinivaara et al. ............ 455/41.2
7,376,099 B2 5/2008 Tseng et al.
(Continued)

OTHER PUBLICATIONS

Ans/IEEE Std 802.11, 1999 Edition (reference 1200 pages—not submitted—will be provided upon request).

(Continued)

*Primary Examiner* — Afsar M Qureshi
(74) *Attorney, Agent, or Firm* — Tutunjian & Bitetto, P.C.; Jennifer R. Davis

(57) ABSTRACT

A method for selecting a channel for an access point (AP) in a Wireless Local Area Network (WLAN). The method includes the AP receiving network conditions of APs within the sensing range of a terminal sent by the terminal, and the AP selecting a channel based on the received network conditions. By forwarding the network conditions of other APs which can be detected by the terminal, the method of the present invention enables an AP to select a channel from the view of a terminal to avoid conflicts at the terminal, thereby improving the available bandwidth of the terminal, and giving a better experience to users.

20 Claims, 7 Drawing Sheets

(56) References Cited

U.S. PATENT DOCUMENTS

| | | |
|---|---|---|
| 7,400,901 B2 | 7/2008 | Kostic et al. |
| 7,406,319 B2 | 7/2008 | Kostic et al. |
| 7,512,379 B2 | 3/2009 | Nguyen |
| 7,555,301 B2 | 6/2009 | Skafidas et al. |
| 7,899,451 B2 | 3/2011 | Hu et al. |
| 8,086,179 B2 | 12/2011 | Song |
| 8,265,027 B2 * | 9/2012 | Chen et al. .................. 370/329 |
| 2004/0248580 A1 * | 12/2004 | Backes et al. ................ 455/450 |
| 2008/0102852 A1 | 5/2008 | Du |
| 2009/0213801 A1 | 8/2009 | Bejerano et al. |
| 2011/0149739 A1 * | 6/2011 | Sarkar ........................ 370/235 |

OTHER PUBLICATIONS

Bianchi, G., Performance analysis of the IEEE 802,11 distributed coordination function, Selective Areas in Communications, IEEE Journal on, vol. 18, No. 3, Mar. 2000.

* cited by examiner

METHOD, ACCESS POINT AND TERMINAL FOR SELECTING CHANNEL IN WIRELESS LOCAL AREA NETWORKS

CROSS REFERENCE TO RELATED APPLICATION

This application is a Continuation of and claims priority from U.S. Pat. No. 8,611,298 issued on Dec. 17, 2013, which in turn claims priority from Issued U.S. Pat. No. 8,265,027 issued on Sep. 11, 2012, which in turn claims priority from Chinese Patent Application No. 200810170699.0 filed on Oct. 30, 2008, the entire contents of both applications are incorporated herein by reference.

BACKGROUND OF THE INVENTION

1. Field of the Invention

The present invention relates to the field of Wireless Local Area Networks (WLANs). More particularly the invention relates to an Access Point (AP) in a WLAN, a method for selecting a channel for an access point (AP) and a method for assisting the AP in selecting a channel.

2. Description of the Related Art

The deployment of WLANs based on the 802.11 standard has increased dramatically in the past few years. For the purpose of occupying the market and providing seamless coverage, multiple service providers independently deploy WLANs in the same range, and moreover each deployment involves multiple Access Points (APs). The APs based on the 802.11a standard are rarely seen in the market due to transmission distance problems and incompatibilities with the 802.11b standard. Other Access Point supported standards such as 802.11b and 802.11g can only support three non-overlapping transmission channels (i.e., channel 1, channel 6 and channel 11). As a result, a terminal always finds multiple APs operating on the same channel and within that terminal's sensing range.

As known by those skilled in the art, WLANs are based on a carrier sensing mechanism to share channels, which results in each terminal having to share channels with all APs and terminals operating on the same channel and within its carrier sensing range. The available bandwidth for each client is thus limited. There have been some alternative solutions for selecting a channel.

One manner is to monitor, by an AP, channels used by other APs, and then to select, by the AP, a channel where there are the fewest APs operating so as to reduce conflicts.

Another manner is to select, by the same service provider, different channels for APs deployed in the same coverage area. However, in the network environment as shown in FIG. 1, such manners for selecting a channel will have a negative impact on the service quality experienced by a terminal 110. For example, it is assumed that in the WLAN shown in FIG. 1, APs 101 and 102 are within the sensing range of terminal 110 and can provide services therefore. AP 101 and AP 102 are respectively out of each other's sensing range.

In the case of AP 101 selecting channel 1, AP 102 also selects channel 1 since it does not detect other APs in its sensing range. However, the terminal 110 can detect that there are two APs operating in channel 1. The terminal 110 will be interfered by signals sent on channel 1 by the other AP and thus its available bandwidth will be reduced, regardless of AP 101 or AP 102 providing a service thereto. However, both AP 101 and AP 102 will not change their own channels as neither of them can detect that they operate in the same channel.

For such a network environment, there is no appropriate solution in the related art.

SUMMARY OF THE INVENTION

In view of above-mentioned problems, the present invention provides a method for selecting a channel for an AP, a method for assisting the AP in selecting a channel, and an AP in the WLAN.

According to an aspect of the present invention, there is provided a method for selecting a channel for an access point (AP) in a Wireless Local Area Network (WLAN), including: the AP receiving network conditions of APs within the sensing range of a terminal sent by the terminal, and the AP selecting a channel based on the received network conditions.

According to another aspect of the present invention, there is provided a method for assisting an access point (AP) in selecting a channel in a Wireless Local Area Network (WLAN), including: a terminal collecting network conditions of APs within its sensing range, and the terminal sending the collected network conditions to the APs within its sensing range.

According to a further aspect of the present invention, there is provided an access point (AP) in a Wireless Local Area Network (WLAN), including: a network conditions communicator, for receiving network conditions of APs within the sensing range of a terminal sent by the terminal, and a channel optimizer for selecting a channel based on the received network conditions.

With every aspect of the present invention, an AP is enabled to select a channel from the view of a terminal so as to avoid conflicts at the terminal, thereby improving the available bandwidth of the terminal, and giving better experiences to users.

BRIEF DESCRIPTION ON THE DRAWINGS

The above and other aspects and advantages will become apparent through the detailed description with reference to the specific embodiments and in combination with the drawings.

Figure 4:
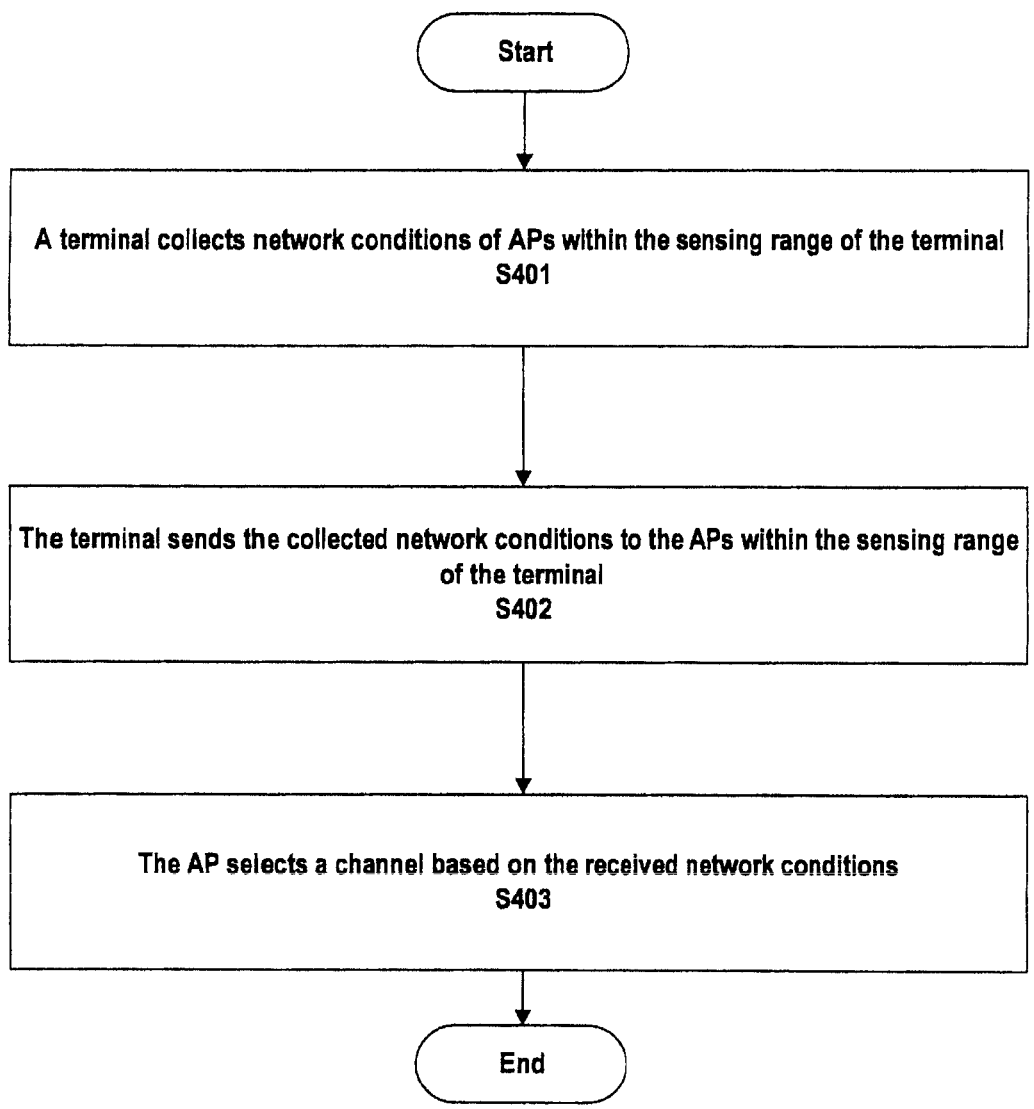
Figure 5:
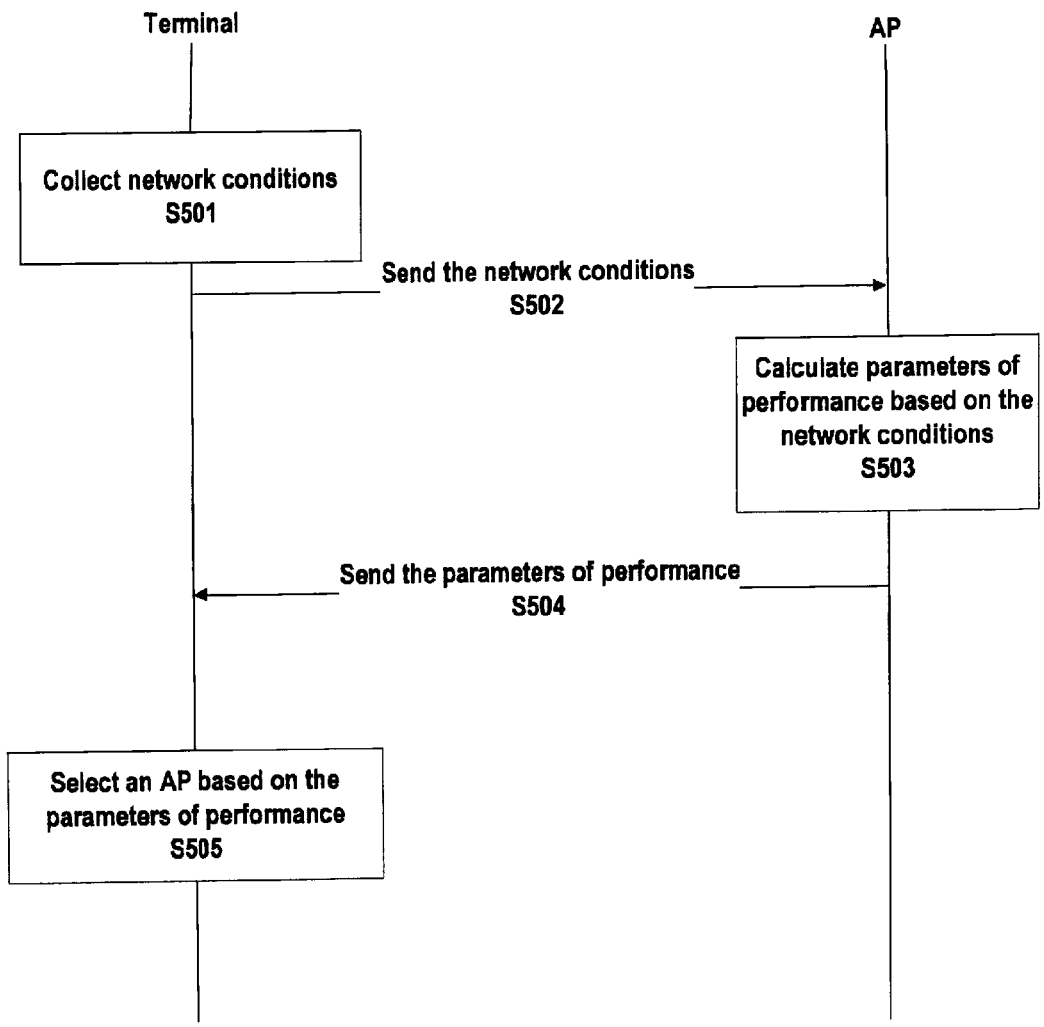
Figure 6:
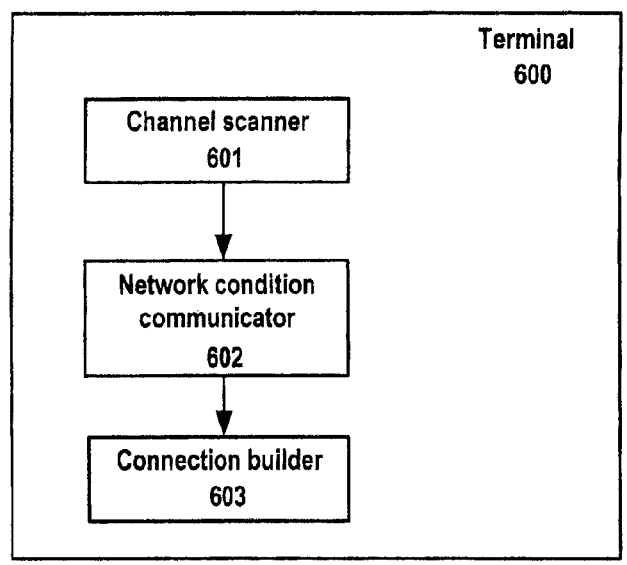
Figure 7:
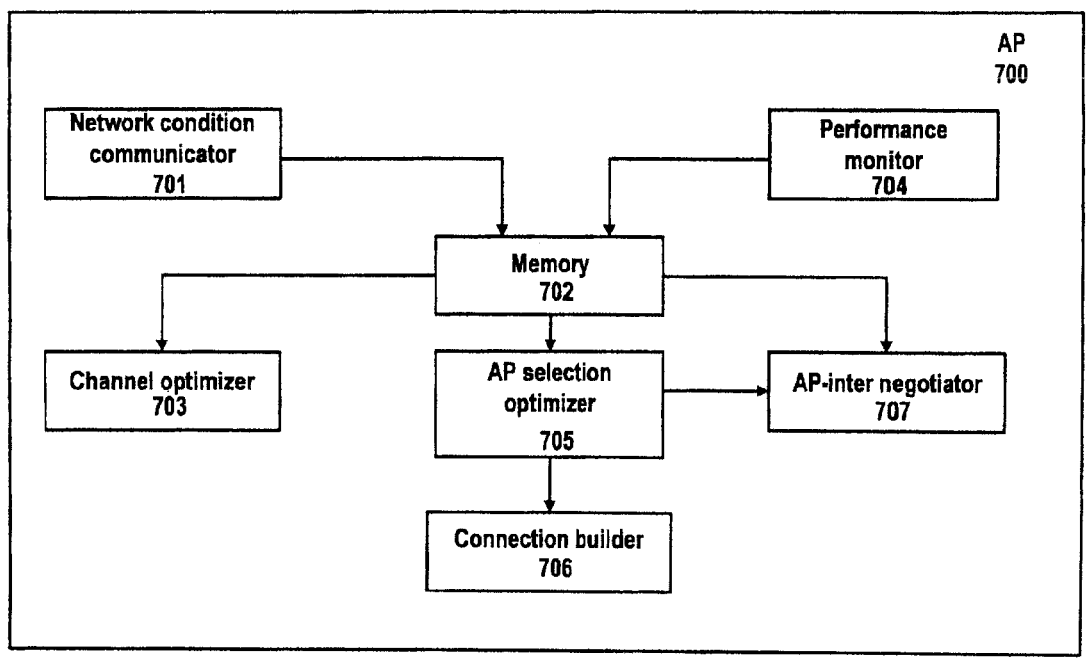
Figure 8:
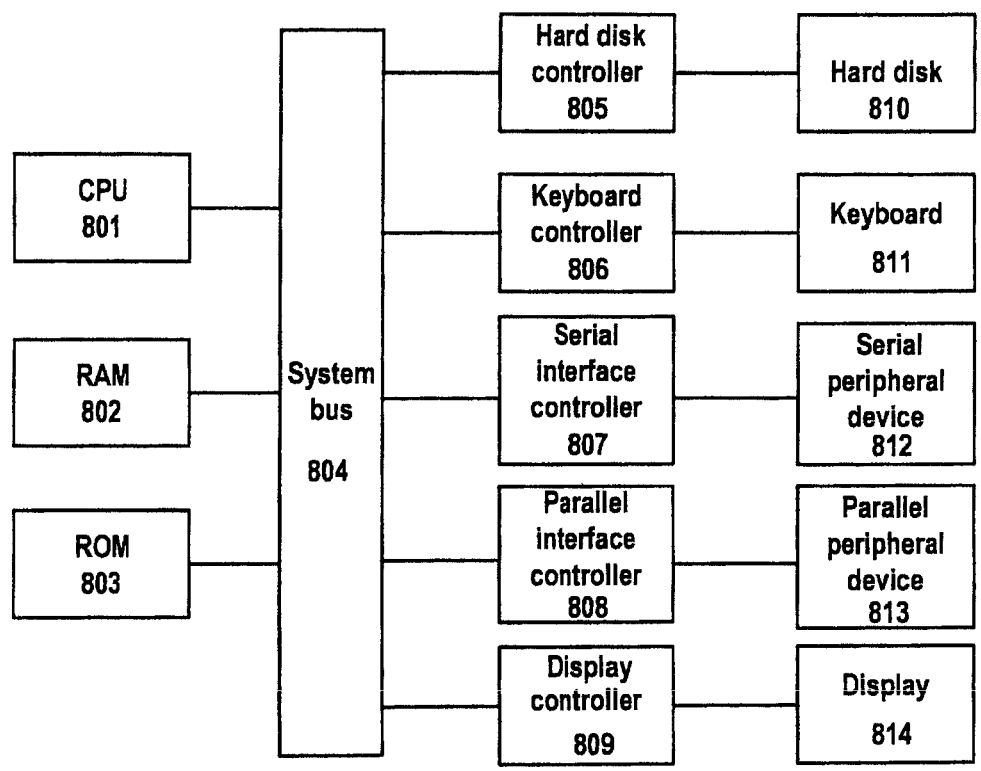

FIG. 4 schematically shows a flow chart of a method for selecting a channel for an AP according to the present invention;

FIG. 5 schematically shows a flow chart of a method for selecting an AP for a terminal according to the present invention;

FIG. 6 is a schematic block diagram of a terminal according to the present invention;

FIG. 7 is a schematic block diagram of an AP according to the present invention; and FIG. 8 is a structural block diagram showing a computer device able to implement an embodiment according to the present invention.

DETAILED DESCRIPTION OF THE PREFERRED EMBODIMENTS

According to an embodiment of the present invention, the AP selects a channel which minimizes conflicts at the terminal.

In other embodiments of the present invention, the method further includes the AP generating statistics on performance of terminals accepting the AP's service, such that the AP selects a channel based on the performance statistics and the received network conditions.

Exemplary Embodiment 1

A method for selecting a channel for an AP according to the present invention shown in FIG. 4 will be described with reference to the schematic diagram illustrating a distribution of a terminal and APs in a WLAN shown in FIG. 1. The network environment shown in FIG. 1 is similar to those described above, and thus its description is omitted herein.

In step S401, a terminal collects network conditions of APs within its sensing range.

In the related art, each AP may broadcast its current network conditions on the used channel periodically, and this has been described in ANSI/IEEE Std 802.11, 1999 Edition, Telecommunications and information exchange between system, Local and metropolitan area networks Specific requirements, Part 11: Wireless LAN Medium Access Control (MAC) and Physical Layer (PHY) Specifications, 1999 (Document 1) which is incorporated by reference herein in its entirety. Thus, terminals can collect the network conditions broadcasted by these APs according to the present invention.

Figure 1:
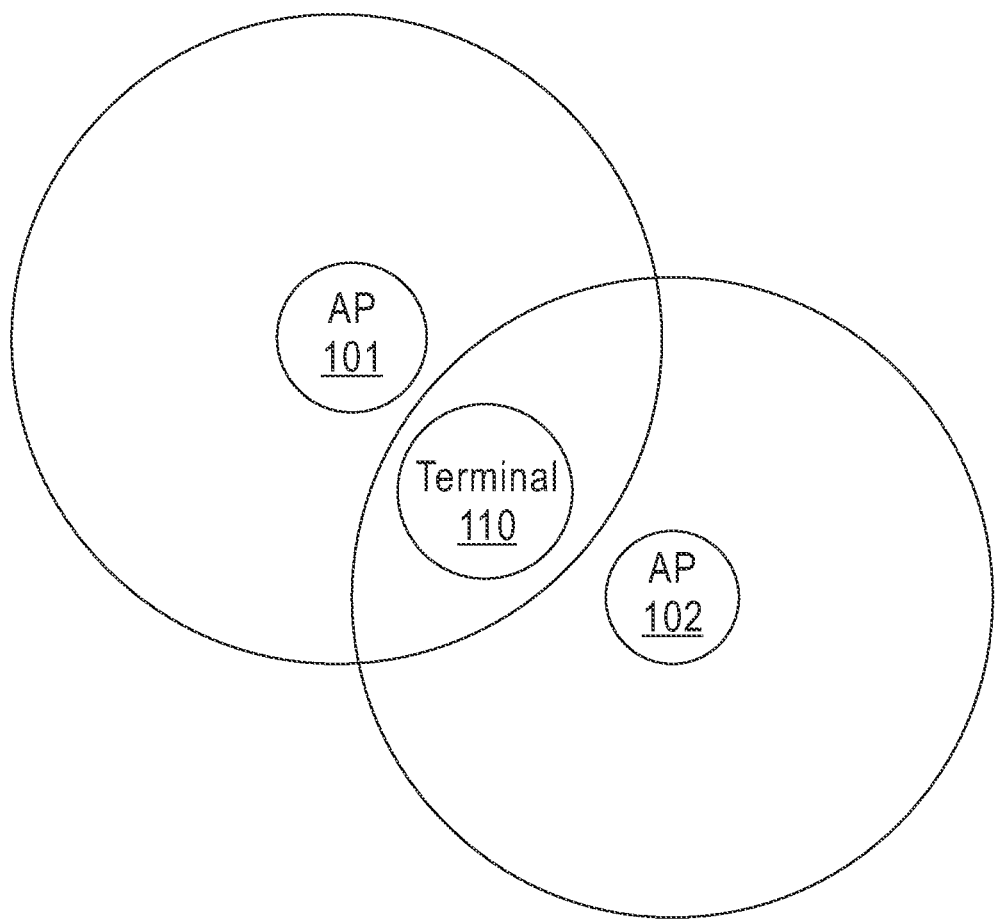
FIG. 1 is a schematic diagram illustrating a distribution of a terminal and APs in a WLAN.

In FIG. 1, the terminal 110 can preferably collect network conditions of APs 101 and 102, that is, collect network conditions of all APs within its sensing range.

Alternatively, a terminal may collect network conditions of some APs within its sensing range. In such a case, the method according to the present invention can be applied to APs which are able to receive network conditions of other APs within the terminal's sensing range sent by the terminal.

Generally, downlink channel information is more important for WLANs. Accordingly, the network conditions of AP 101 may include downlink channel information from AP 101 to terminal 110, or may include the downlink channel information and traffic load information of AP 101.

The network conditions of AP 102 may include downlink channel information from AP 102 to terminal 110, or may include the downlink channel information and traffic load information of AP 102.

The network conditions are not limited to the given examples, but may include any information regarding channel, APs and terminals.

The downlink channel information may include a channel number (such as channel 1, channel 6 or channel 11), or may include one or both of the signal strength of the downlink channel and the wireless standard used in the channel (such as, 802.11b or 802.11g), and channel number.

However, those skilled in the art can appreciate that the downlink channel information is not limited to the given exemplary information, but can include any information related to the downlink channel, such as encryption information.

Table 1 can be used to represent the network conditions examples of APs 101 and 102 according to this embodiment.

TABLE 1

| AP Name | Signal Strength | Encryption | Load | Operating Mode | Channel |
|---------|-----------------|------------|------|----------------|---------|
| AP 101  | 98%             | Open       | 70%  | 802.11g        | 1       |
| AP 102  | 93%             | Open       | 25%  | 802.11b        | 1       |

In step S402, the terminal sends the collected network conditions to APs within its sensing range.

According to the present invention, the terminal can send the collected network conditions to APs by inserting them in reserved fields in the association request frame. However, it should be understood that the association request frame is merely an example of a frame for initiating an association request to an AP, and frames for this purpose are not limited to it.

In FIG. 1, the terminal 110 may preferably send the collected network conditions to all APs within the terminal's sensing range, i.e., the terminal may send the collected network conditions of APs 101 and 102 to APs 101 and 102.

Alternatively, a terminal may send collected network conditions to some APs within its sensing range. For example, when security is a consideration, a terminal may only send network conditions of APs within a same management domain to APs within its management domain, instead of sending such network conditions to APs in other management domains. Similarly, network conditions of APs in other management domains will not be sent to APs in its management domain.

Alternatively, a terminal may send only the network conditions to the AP selected by a user. For instance, if a user wishes to use AP 101, the terminal 110 sends the collected network conditions of APs 101 and 102 to AP 101.

Finally, in step S403, an AP selects a channel based on the received network conditions.

AP 101 in FIG. 1 is taken as an example. AP 101 learns, based on the network conditions received from terminal 110, that AP 102 is operating on channel 1 and then it may select a channel different from the one where AP 102 is operating, for instance channel 6 or channel 11, so as to avoid conflicts at the terminal 110.

Exemplary Embodiment 2

A brief description of the method, as shown in FIG. 4, for selecting a channel for an AP according to the present invention will be given with reference to FIG. 2. Lines representing AP's coverage range are omitted in FIG. 2 for clarity.

Figure 2:
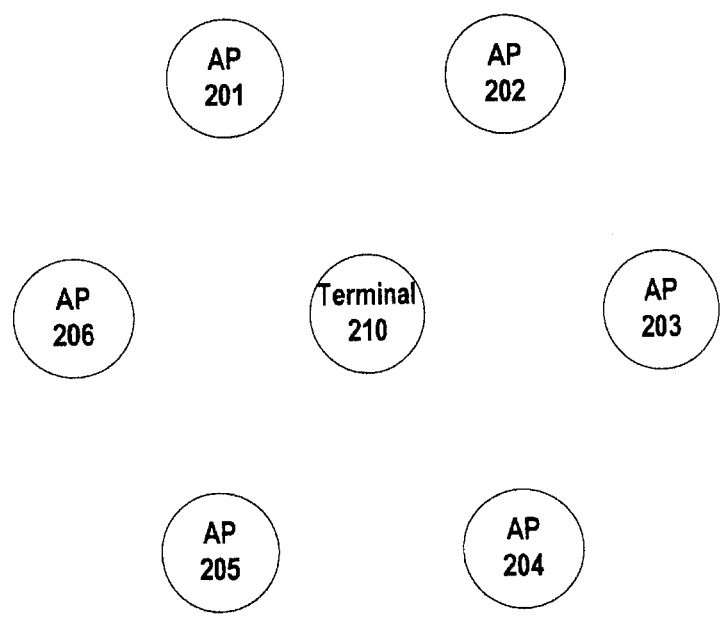
FIG. 2 is another schematic diagram illustrating a distribution of a terminal and APs in a WLAN.

In the WLAN shown in FIG. 2, APs 201-206 are within the sensing range of terminal 210, but none of the APs are within sensing ranges of each other. It is assumed that AP 201, AP 202 and AP 203 operate on channel 1, AP 204 on channel 6, and APS 205 and 206 on channel 11.

In accordance with the method shown in FIG. 4, the terminal 210 collects network conditions of APs 201-206 in step S401, and sends the collected network conditions to APs 201-206 in step S402.

Taking AP 201 as an example, AP 201 learns that: it is operating on channel 1 with two other APs at the same time, there are two APs operating on channel 11, and only one AP is operating on channel 6. Thus AP 201 selects the channel where there are the fewest APs operating as its operating channel in step S403. In other words, AP 201 may select channel 6 to avoid the occurrence of more conflicts at terminal 210.

Exemplary Embodiment 3

Figure 3:
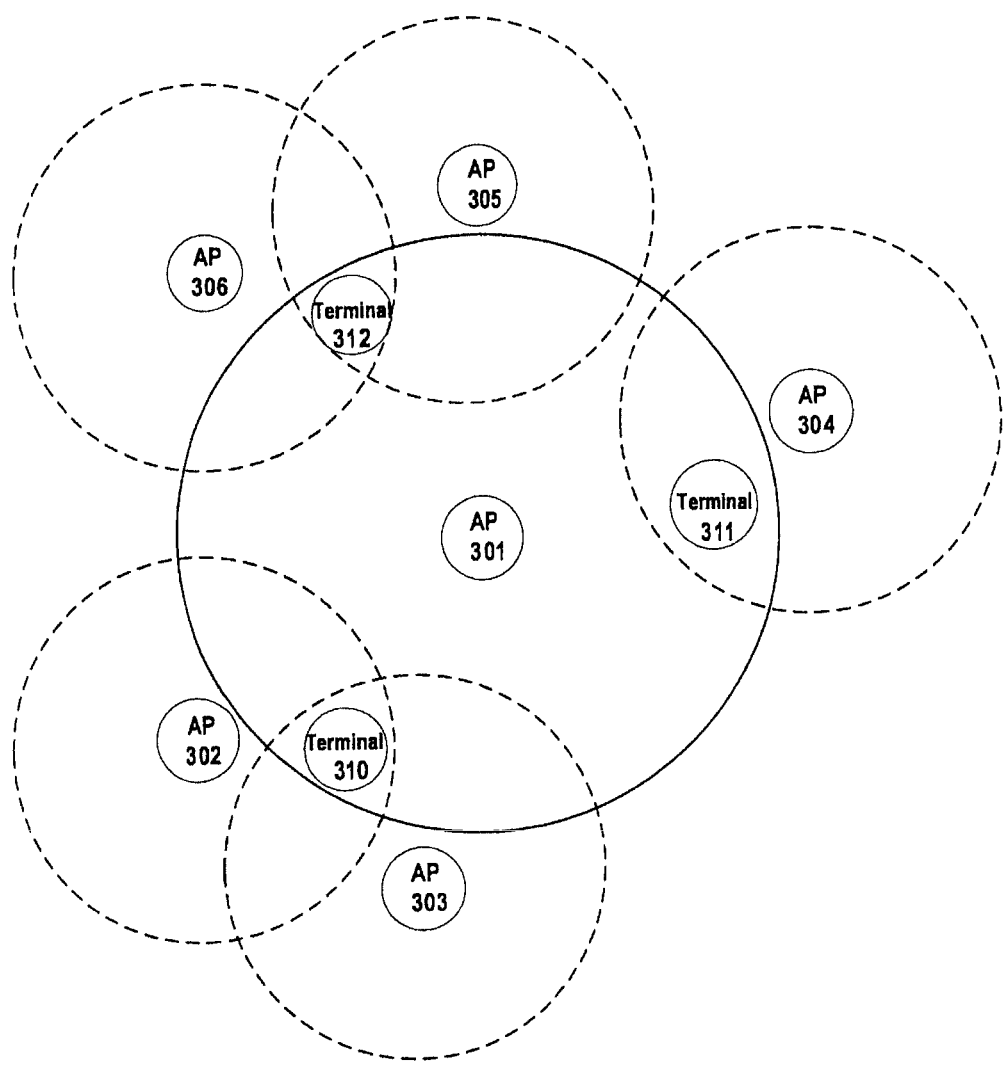
FIG. 3 is still another schematic diagram illustrating a distribution of terminals and APs in a WLAN.

A method for selecting a channel for an AP according to the present invention will be described as shown in FIG. 3.

In the WLAN shown in FIG. 3, AP 301 provides services to terminals 310-312; APs 302 and 303 are within the sensing range of terminal 310; AP 304 is within the sensing range of terminal 311; and APs 305 and 306 are within the sensing range of terminal 312.

In step S401, AP 301 attempts to select a channel. Terminals 310-312 collect network conditions of APs within their own sensing ranges, that is, all terminals accepting service from AP 301 collect network conditions of APs within their own respective sensing ranges.

Alternatively, network conditions can be collected by less than all of terminals 310-312. In step S402, terminals 310-312 send the collected network conditions to all APs within their own respective sensing ranges.

Additionally, if terminals 310-312 are unable to send network conditions of other APs to AP 301 simultaneously, AP 301 may alternatively store the received network conditions for subsequent operations after all collectable network conditions are collected.

AP 301 can capture statistics on the performance of all terminals 310-312 which accept its service.

Alternatively, AP 301 can capture statistics on the performance of one or more of terminals 310-312, that is, capture statistics of the performance of some terminals accepting its service.

The performance statistics may include a terminal's priority and/or load statistic. However, as appreciated by those skilled in the art, the performance statistic may include any parameters of terminal performance, and is not limited to the given example.

Alternatively, AP 301 can store the performance statistics for future use as needed.

In step S403, AP 301 selects, based on network conditions of other APs received from terminals 310-312 and performance statistics on terminals 310-312, a channel which can provide the largest throughput for the three terminals.

Generally speaking, the performance of an AP is evaluated by aggregate throughput of all terminals served by this AP. Those skilled in the art can evaluate the performance of an AP using any parameters related to the evaluation of service quality, not limited to the aggregate throughput of all terminals utilized herein, such as throughput of some terminals or even one terminal served by the AP, delay, jitter, and packet loss rate. The aggregate throughput of all terminals served by the AP is just an example.

Specifically, the throughput is defined as the payload size transmitted in a unit time, i.e., payload which can be successfully transmitted in a transmission slot divided by the average length of a slot, and this has been described in Bianchi, G., Performance analysis of the IEEE 802.11 distributed coordination function, Selected Areas in Communications, IEEE Journal on, vol. 18, no. 3, March 2000 which is incorporated by reference herein in its entirety.

For a given client $U_j$ (j is a natural number), if it accepts the service from AP $A_i$ (i is a natural number) and operates on channel k (k is a natural number), its throughput is given by $$S_{ij}^k = \frac{p_{s,ij}^k E[L]}{p_{b,j}^k T_{busy} + (1 - p_{b,j}^k) T_{idle}} \quad (1)$$

where
E[L] is an average payload size of a data packet;
$T_{busy}$ is an average length of a busy time slot;
$T_{idle}$ is an average length of an idle time slot;
$p_{s,ij}^k$ is a probability that there is a successful transmission from $A_i$ (operating on the channel k) to $U_j$ in a time slot;

$p_{b,j}^k$ is a probability that the channel k is sensed to be busy by $U_j$ in a time slot.

$p_{s,ij}^k$ in formula (1) is given by $$p_{s,ij}^k = p_{ij} \prod_{m: A_m \in \Psi_j^k, m \neq i} (1 - p_m) \quad (2)$$

where
$p_{ij}$ is a probability that $A_i$ sends data packets to user $U_j$ at a time slot;
$p_i$ is a probability that $A_i$ transmits in a time slot;
$\psi_j^k$ is the set of APs operating on channel k and within the sensing range of $U_j$.

$m: A_m \in \psi_j^k, m \neq i\_A_m$ is an AP operating on channel K and belonging to the set of APs within the sensing range of, $U_j$ wherein m is an identifier; m≠i represents that $A_i$ is not included.

$p_{b,j}^k$ in formula (1) is given by $$p_{b,j}^k = 1 - \prod_{m: A_m \in \Psi_j^k} (1 - p_m) \quad (3)$$

By substituting formulae (2) and (3) into formula (1), the throughput of $U_j$ is calculated as $$S_{ij}^k = \frac{p_{ij} E[L] \prod_{m: A_m \in \Psi_j^k, m \neq i} (1 - p_m)}{T_{busy} - (T_{busy} - T_{idle}) \prod_{m: A_m \in \Psi_j^k} (1 - p_m)} \quad (4)$$

where $p_{ij}$ depends on the traffic load of $A_i$ and the number of terminals accepting the service from $A_i$, and thus only $A_i$ knows the value of $p_{ij}$. Because $p_m$ depends on the traffic load of $A_m$ and is known by $\psi_j^k$ is known by $U_j$ only, $$\prod_{m: A_m \in \Psi_j^k, m \neq i} (1 - p_m) \text{ and } \prod_{m: A_m \in \Psi_j^k} (1 - p_m)$$

can only be provided by $U_j$. This further confirms that a channel minimizing the conflicts at a terminal can be selected for an AP according to the present invention, for the AP is able to receive network conditions of other APs which are known by terminals only.

After getting the throughput of each user in a given channel, the AP is capable of selecting, based on formula (5), the channel which can maximize the aggregate throughput of all terminals served by the AP, i.e., selects the channel corresponding to the maximum value of $$\sum_{U_j \in \Theta_i} S_{ij}^k$$

to optimize the network performance.

$$\max_{k:\text{available channels}} \sum_{U_j \in \Theta_i} S_{ij}^k \quad (5)$$

where $\Theta_i$ denotes the set of terminals served by $A_i$.

The AP 301 hereby can select, based on the above formulae, a channel which can maximize the aggregate throughput of all terminals serviced by AP 301.

The method for selecting a channel for an AP according to the present invention has been described above, and another application of the present invention, i.e., selecting an AP for a terminal based on network conditions of APs within the terminal's sensing range sent by the terminal, will be described hereinafter. Generally, an AP is selected by a user manually. According to the present invention, multiple APs can help a user to select or recommend an AP with the best performance for a user based on the network conditions sent by terminals, the AP's load and the like in order to further improve the user experiences.

Exemplary Embodiment 4

A flowchart of selecting an AP for a terminal according to the present invention shown in FIG. 5 will be described with reference to the schematic diagram illustrating a distribution of a terminal and APs in a WLAN shown in FIG. 2.

In FIG. 2, it is assumed that terminal 210 needs to select an AP to provide service to it.

In step S501, terminal 210 may preferably collect network conditions of APs 201-206, and send the collected network conditions to APs 201-206 in step S502.

Alternatively, terminal 210 may collect network conditions of some of the APs 201 to 206, and send the collected network conditions to some of the APs 201 to 206.

Alternatively, terminal 210 may send its QoS requirements to APs.

In step S503, APs 201 to AP 206 calculate parameters representing the kind of performance of service available for terminal 210, respectively, based on the received network conditions. The parameters can include one or more of available bandwidth, jitter and packet loss rate. As known by those skilled in the art, parameters of performance are not limited to these three types, but can be any parameters related to evaluate the service.

For the purpose of clarity, the parameters of performance calculated by APs 201 to 206 respectively are shown in Table 2.

TABLE 2

| AP Name | Available Bandwidth | Jitter | Packet Loss Rate |
|---|---|---|---|
| AP 201 | 10M | 21% | 25% |
| AP 202 | 2M | 5% | 2% |
| AP 203 | 9M | 6% | 30% |
| AP 204 | 8M | 20% | 15% |
| AP 205 | 7M | 8% | 12% |
| AP 206 | 3M | 15% | 20% |

In step S504, APs 201-206 send the parameters of performance shown in FIG. 2 to terminal 210 respectively.

In step S505, the user of terminal 210 selects an AP to accept its service based on the received parameters of performance and its own QoS requirements. Accepting the AP's service includes directly requesting the selected AP to associate through initiating a new association request frame; and establishing a connection to send traffic data after the association confirmation from the AP, thus accepting the AP's service.

If a user desires to use terminal 210 to communicate with an AP to implement high-speed downloads of files, available bandwidth is the terminal's primary concern. Based on such a QoS requirement, the terminal 210 may select AP 201 to provide service, because it has a higher available bandwidth than other APs. If there are a plurality of APs satisfying its bandwidth requirement, terminal 210 can select one from those APs to provide service.

If terminal 210 wishes to communicate with an AP to implement VoIP, packet loss rate is the terminal's primary concern. Based on such a QoS requirement, terminal 210 may select AP 202 to accept its service since AP 202 has a lower packet loss rate. If there are a plurality of APs satisfying the packet loss rate requirement, terminal 210 can select one from those APs to provide service.

Exemplary Embodiment 5

According to this embodiment, for example, terminal 210 may send its own QoS requirements with the network conditions to APs within its sensing range.

If all APs or some APs within the sensing range of terminal 210 belong to a same management domain, they may send their own network conditions and QoS requirements of terminal 210 to a management entity connected to such APs. Alternatively they may send the calculated parameters of performance and QoS requirements of terminal 210 to the management entity after the parameters representing the kinds of performance being available for terminal 210 are calculated. The management entity is able to negotiate one AP to provide service to terminal 210 based on the QoS requirements and one of the network conditions of APs and these parameters of performance. Then the AP establishes a connection with the terminal 210. Or, the management entity sends a message to the selected AP to notify the terminal 210 of the AP being recommended to provide service to it, so as to be selected by the user of the terminal.

Alternatively, if all APs or some APs within the sensing range of terminal 210 can communicate with each other, each AP can send its own network conditions and QoS requirements of terminal 210 to other APs. They may also send the calculated parameters of performance and QoS requirements of terminal 210 to other APs after the parameters representing the kinds of service being available for the terminal 210 are calculated. Each AP then compares the performance of service that it can provide to the terminal 210 with the performance of services that other APs can provide to the terminal 210 respectively. If the performance of service that an AP can provide is better than the performance of services that other APs can provide, the AP and terminal 210 establish a connection. Or, the selected AP notifies the terminal 210 that it is the recommended one to provide a service to the terminal 210, and the user of the terminal can select it.

The method for selecting an AP for a terminal according to the present invention has been described above, and structures of a terminal and an AP for implementing the above-mentioned method according to the present invention are described as follows.

Exemplary Embodiment 6

A description of a terminal according to the present invention is given with reference to FIG. 6. FIG. 6 is a schematic block diagram of a terminal 600 according to the present invention.

The terminal 600 can include a channel scanner 601 for collecting network conditions broadcasted by APs within the sensing range of terminal 600, since each AP would broadcast its current network conditions on the used channel periodically. The terminal 600 may also include a network conditions communicator 602, for sending the network conditions collected by the channel scanner 601 to APs (this can be implemented by initiating an association request frame to initiate an association request so as to send the network conditions which will be inserted into the reserved fields of the association request frame to an AP), and alternatively for further sending QoS requirements of the terminal 600 to APs within the sensing range of the terminal 600. The terminal 600 may further include a connection builder 603, for receiving parameters of performance which can be provided for the terminal 600 from APs within the sensing range of terminal 600, and selecting one AP therefrom to provide service based on these parameters of performance and its own QoS requirements.

Exemplary Embodiment 7

A description of an AP according to the present invention is given with reference to FIG. 7. FIG. 7 is a schematic block diagram of an AP according to the present invention.

AP 700 can include a network conditions communicator 701, for receiving network conditions of APs within the sensing range of the terminal sent by the terminal, and alternatively for receiving the QoS requirements of the terminal sent therefrom. AP 700 can also include a channel optimizer 703 for selecting a channel based on the network conditions received by the network conditions communicator 701.

AP 700 can also include a memory 702 for storing the network conditions received by the network conditions communicator 701 when the terminals cannot send AP 700 the network conditions of other APs simultaneously. The subsequent operations can be implemented after all collectable network conditions of APs are collected.

AP 700 may further include a performance monitor 704, for making a statistic on performance of terminals accepting its service. In such case, the memory 702 can also store the performance statistics for further call-out when needed; and the channel optimizer 703 can select a channel based on the received network conditions and performance statistics.

AP 700 can further include an AP selection optimizer 705 for calculating parameters of performance that can be provided to the terminal based on the network conditions received by the network conditions communicator 701. AP 700 can further include a connection builder 706 for sending the parameters of performance calculated by the AP selection optimizer 705 to the terminal, such that the terminal can select an AP for providing a service to it based on the received parameters of performance.

Optionally, AP 700 can include an inter-AP negotiator 707, for negotiating with other APs to select one AP to provide service to the terminal based on the QoS requirements of the terminal and one of the received network conditions and parameters of performance calculated by the AP selection optimizer 705. The specific negotiation procedure has been described in Embodiment 5.

Exemplary Embodiment 8

Hereinafter, reference will be made to FIG. 8 to describe a computer device in which the present invention can be implemented. FIG. 8 schematically illustrates a structural block diagram of a computer device in which an embodiment according to the present invention can be implemented.

The computer system as shown in FIG. 8 includes a CPU (Central Processing Unit) 801, a RAM (Random Access Memory) 802, a ROM (Read Only Memory) 803, a system bus 804, a hard disk controller 805, a keyboard controller 806, a serial interface controller 807, a parallel interface controller 808, a display controller 809, a hard disk 810, a keyboard 811, a serial peripheral device 812, a parallel peripheral device 813 and a display 814. Among these components, connected to the system bus 804 are the CPU 801, the RAM 802, the ROM 803, the hard disk controller 803, the keyboard controller 805, the keyboard controller 806, the serial interface controller 807, the parallel interface controller 808 and the display controller 809. The hard disk 810 is connected to the hard disk controller 805; the keyboard 811 is connected to the keyboard controller 806; the serial peripheral device 812 is connected to the serial interface controller 807; the parallel peripheral device 813 is connected to the parallel interface controller 808; and the display 814 is connected to the display controller 809.

The structural block diagram in FIG. 8 is shown only for illustration purpose, and is not intended to limit the invention. In some cases, some devices can be added or reduced as required.

Further, the embodiments of the present invention can be implemented with software, hardware or the combination of software and hardware. The hardware part can be implemented by a special logic; the software part can be stored in a memory and executed by a proper instruction execution system like a microprocessor or a special designed hardware.

Further, the embodiments of the present invention can be implemented in software, hardware, or a combination thereof. The hardware portion can be implemented by a special logic. The software portion can be stored in a memory and executed by a proper instruction execution system such as a microprocessor or a dedicated designed hardware.

While this specification contains many specific details, these should not be constructed as limitations on the scope of the disclosure or of what may be claims, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed, to achieve desirable results. In certain circumstances, multitasking and parallel processing may be advantageous. Moreover, the separation of various system components in the implementations described above should not be understood as requiring such separation in all implementations. It should be understood that the described program components and systems can generally be integrated together in a single software product or packaged into multiple software products.

While the present invention has been described with reference to the embodiments of the present invention considered by far, it should be understood that the invention is not limited to the embodiments disclosed herein. On the contrary, all modifications and equivalent arrangements that come within the spirit and range of the appended claims are intended to be embraced therein. The scope of the appended claims is accorded with the broadest interpretation to encompass all such modifications and equivalent structures and functions.

What is claimed is:

1. A method for selecting a channel for an Access Point (AP) in a Wireless Local Area Network (WLAN), the method comprising:
   receiving, by the AP from a terminal, network conditions of APs that are within the sensing range of the terminal;
   selecting, by the AP, a channel based on the received network conditions;
   calculating, by the AP, parameters of performance that the AP can provide to the terminal; and
   sending, by the AP, the calculated parameters of performance to the terminal such that the terminal can select an AP to provide a service based on the received parameters of performance.

2. The method of claim 1, wherein the network conditions include downlink channel information, the downlink channel information comprising at least one of a channel number, a channel strength and a wireless mode.

3. The method of claim 1, further comprising the AP storing the received network conditions.

4. The method of claim 1, wherein the AP selects a channel in order to reduce conflicts at the terminal.

5. The method of claim 1, further comprising:
   generating, by the AP, performance statistics of terminals accepting the AP's service; and
   selecting, by the AP, a channel based on the performance statistics and the received network conditions.

6. The method of claim 5, wherein the AP selects a channel maximizing an aggregate throughput of terminals accepting the AP's service.

7. The method of claim 1,
   wherein the parameters of performance comprises at least one of an available bandwidth rate, jitter, and a packet loss rate.

8. The method of claim 1, wherein the AP receives Quality of Service (QoS) requirements of the terminal sent by the terminal, the method further comprising: negotiating with other APs to select one AP so as to provide a service to the terminal based on (i) the QoS requirements of the terminal and (ii) one of the received network conditions and the calculated parameters of performance.

9. The method of claim 1, wherein the network conditions comprise: (i) information on a downlink channel from an AP to the terminal that is within the sensing range of the terminal; or (ii) downlink channel information and traffic load information of an AP within the sensing range of the terminal.

10. A method for assisting an access point (AP) in selecting a channel in a Wireless Local Area Network (WLAN), comprising:
    collecting, by a terminal, network conditions of APs within the terminal's sensing range; and
    sending, by the terminal, the collected network conditions to the APs within the terminal's sensing range;
    receiving, by the terminal, parameters of performance sent from APs within the terminal's sensing range; and
    selecting, by the terminal, an AP to provide service based on the received parameters of performance;
    wherein the parameters of performance are calculated by APs within the sensing range of the terminal.

11. The method of claim 10, wherein the network conditions include downlink channel information, the downlink channel information comprising a channel number and at least one of a channel strength and a wireless mode.

12. The method of claim 10, further comprising the AP storing the received network conditions.

13. The method of claim 10, wherein the AP selects a channel in order to reduce conflicts at the terminal.

14. The method of claim 11,
    wherein the parameters of performance comprise at least one of an available bandwidth, jitter, and a packet loss rate.

15. The method of claim 10, wherein the network conditions comprise information on (i) a downlink channel from an AP within the sensing range of the terminal to the terminal; or (ii) the downlink channel information and traffic load information of an AP within the sensing range of the terminal.

16. A method for selecting a channel for an Access Point (AP) in a Wireless Local Area Network (WLAN), the method comprising:
    receiving, by the AP from a terminal, network conditions of APs that are within the sensing range of the terminal; and
    selecting, by the AP, a channel based on the received network conditions
    calculating, by the AP, parameters of performance that the AP can provide to the terminal based on the received network conditions; and
    sending, by the AP, the calculated parameters of performance to the terminal such that the terminal can select an AP to provide a service based on the received parameters of performance.

17. The method of claim 16, wherein the network conditions include downlink channel information, the downlink channel information comprising at least one of a channel number, a channel strength and a wireless mode.

18. The method of claim 16, further comprising the AP storing the received network conditions.

19. The method of claim 16, further comprising:
    generating, by the AP, performance statistics of terminals accepting the AP's service; and
    selecting, by the AP, a channel based on the performance statistics and the received network conditions.

20. The method of claim 16, wherein the parameters of performance comprise at least one of an available bandwidth rate, jitter, and a packet loss rate.

* * * * *